UNITED STATES PATENT OFFICE.

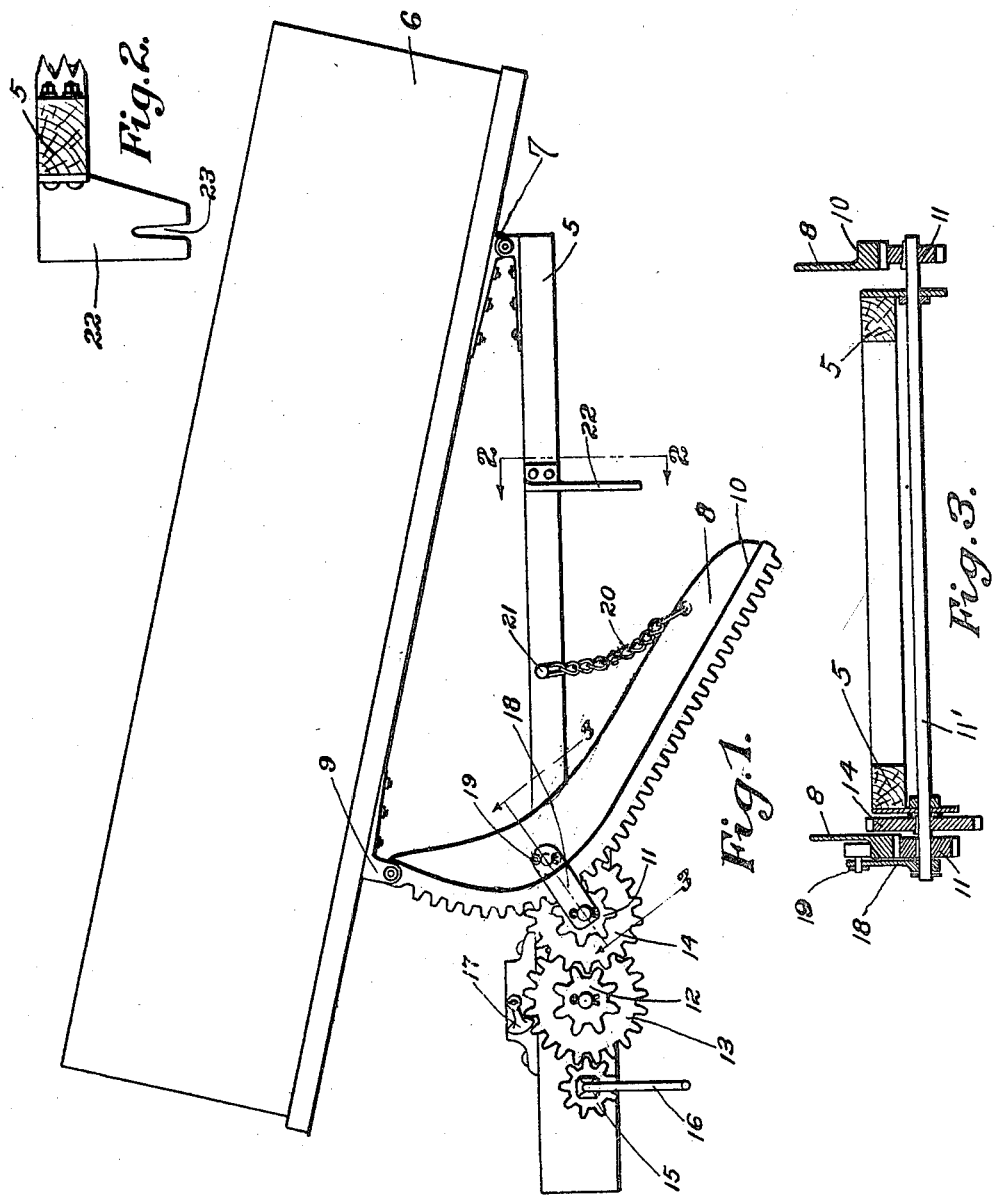

CHARLES D. AMMON, OF DAVID CITY, NEBRASKA.

AUTOMOBILE DUMPING-BODY.

1,323,670.   Specification of Letters Patent.   Patented Dec. 2, 1919.

Application filed May 19, 1919. Serial No. 298,152.

*To all whom it may concern:*

Be it known that I, CHARLES D. AMMON, a citizen of the United States, residing at David City, in the county of Butler and State of Nebraska, have invented new and useful Automobile Dumping-Bodies, of which the following is a specification.

The present invention relates to dumping bodies for vehicles, the primary object being to provide a dumping body which may be readily elevated to the proper incline and locked in such position, or locked in a horizontal position against any movement whatsoever.

A further object of the present invention is to provide a manually operable mechanism for raising and lowering a dumping vehicle body that includes parabola shaped rack bars operatively connected with the dumping wagon body together with a pinion mechanism for operating the rack bars to tilt the wagon body, the particular shape of the rack bars taking the weight of the wagon body from the pinion mechanism thereby rendering the same less laborious to operate.

Another important object of the invention resides in the provision of a dumping vehicle body which includes a rack bar that is so constructed as to serve as a track way for rollers which retains the rack bar against lateral movement.

Another general object of the invention resides in the provision of a dumping vehicle body having the above characteristics, which is simple in construction, consists of few parts that may be readily assembled and disassembled, and which may be manufactured and sold at a minimum cost.

With the above and other general objects and advantages in mind, the invention consists of novel combinations of parts, constructions and arrangements, operations and general assemblage, the details of which will be enlarged upon hereinafter and recited in the sub-joined claims, the invention being illustrated in the accompanying drawing, wherein:—

Figure 1 is a side elevation of a vehicle body embodying my improvements, the vehicle body being in elevated position;

Fig. 2 is a transverse sectional view taken on line 2—2 of Fig. 1 and showing the plate for retaining the rack bar against lateral movement when the body is in horizontal position; and Fig. 3 is a transverse sectional view taken on line 3—3 of Fig. 1.

On the drawings, wherein like characters of reference designate like parts on all of the views, the numeral 5 designates a wagon bed, a suitable dumping body 6 being hinged to the rear end of the bed as at 7.

A pair of rack bars of parabola shape have their curved ends pivotally connected with brackets secured to the under face of the body 6 adjacent the forward or free end of the wagon body, the rack bars being designated at 8 and the brackets at 9. The rack bars 8 are substantially L-shaped in cross section, thus a track 10 is afforded at one side of each of the rack bars, and extends from end to end of the same. Rotatable upon each side of the bed 5 is a pinion 14 fixed to a shaft 11′ extending transversely of the bed 5 and which is rotated by a smaller pinion 12 fixed to one face of a pinion 13, a small pinion 11 being secured to the outer face of one of the pinions 14 and is in mesh with the teeth of the rack bar 8. The pinion 13 is rotated by a pinion 15 journaled on the bed 5 and is operated by a crank handle 16. Upon rotation of the crank handle 16 the gearing described will be rotated to raise the rack bar in a vertical position. In order to lock the rack bar in this position or against being moved a locking pawl 17 is provided and is engageable with the gear 13 to retain the gears against rotation and thereby preventing the rack bar moving.

Fixed upon each end of the shaft upon which the pinions 11 are mounted is a plate 18 carrying a roller 19 at its outer end which is mounted upon the trackway 10 of each of the rack bars and guides the same in its movement and retains the teeth of the rack bar in mesh with the pinion 14.

A chain 20 is attached to the free end of the rack bar 8 and is adapted to have any one of its links engaged with a pin 21 projecting from the bed 5 when the rack bar is in lowered position. An outstanding plate 22 is attached to the frame bed 5 and is provided with a V-shaped notch 23 in its lower end which receives the rack bar when in lowered position. Thus it will be seen that this plate and chain 20 retain the rack bar against vibration.

The embodiment of the invention here shown and described is considered the preferred construction, but it will be understood that the same may be modified in many respects and that the limits of such modification are governed only by what is claimed.

What is claimed is:—

1. A dumping wagon including a body, a bed for supporting the body, said body being hingedly connected to the bed adjacent one of the ends thereof, shafts supported by the bed, gear wheels supported by the shafts, whereby movement of one gear wheel causes a relative movement of the remaining gear wheels, a parabola shaped rack bar pivotally mounted upon each side of the vehicle body, said rack bar coöperating with one of the gear wheels for causing a movement of the rack bar with relation to the body, flexible means connecting the rack bar to the body for restricting movement of the rack bar, and means secured to the body and located in the path of travel of the rack bars, when the same are moved in one direction, for preventing movement of the rack bars laterally.

2. In a dumping vehicle body, a vehicle bed, a body hinged to the bed at one end, a parabola shaped rack bar pivotally mounted upon each side of the vehicle body, gearing mounted upon the bed and operatively connected with the rack bar, and means for rotating the gearing whereby the rack bar raises the body, and a plate fixed to the bed and provided with a slot for the reception of the rack bars at each side of the bed when the rack bars are in lowered position, and chains carried by the rack bars and adapted to be attached to the bed to retain the rack bars against movement.

In testimony that I claim the foregoing as my own, I have hereto affixed my signature in the presence of two witnesses.

CHARLES D. AMMON.

Witnesses:
ADOLPH PRELL,
M. R. SHERWOOD.